Patented May 19, 1942

2,283,237

UNITED STATES PATENT OFFICE 2,283,237

HALOGENATION OF SATURATED ALIPHATIC NITRILES

Le Roy U. Spence, Elkins Park, and Darrel J. Butterbaugh, Philadelphia, Pa., assignors to Röhm & Haas Company Philadelphia, Pa.

No Drawing. Application August 17, 1940, Serial No. 353,066

8 Claims. (Cl. 260—464)

This invention relates to a process for the manufacture of halogenated, saturated aliphatic nitriles. It relates more particularly to the manufacture of monohalogenated aliphatic nitriles, especially those containing up to five or six carbon atoms, by halogenation of the saturated aliphatic nitriles in the vapor phase at elevated temperatures.

According to Backunts, Ber. 9, 1594 (1876) chlorine does not react with cold or warm liquid acetonitrile. In the presence of a small amount of iodine a very slow reaction takes place which yields small amounts of trichloroacetonitrile after several days. Otto (Ann. d. Chem. 116, 196 (1860)) passed chlorine into liquid propionitrile in diffuse light until unabsorbed chlorine began to escape. On cooling the reaction mixture with a salt and ice bath, a white crystalline solid separated which was later shown to be $\alpha,\alpha$-dichloro propionamide (Ann. 132, 181 (1864)). This was filtered off and the liquid distilled. It boiled at 104–107° C. leaving a brown residue. The distillate was $\alpha,\alpha$-dichloro-propionitrile and the residue was later shown to be the trimer of this compound (Ber. 23, 826 (1890)). If the chlorination is carried out at the boiling point of the nitrile, much less of the trimeric material is formed (Ber. 10, 264 and 2040 (1877)). In these processes no monochloropropionitrile is formed. According to U. S. Patent No. 2,174,756 a mixture of the monochlorides of isobutyronitrile is obtained when chlorine is led into isobutyronitrile in the presence of sunlight at 45 to 65° C. U. S. Patent No. 2,175,810 discloses that at the boiling point chlorine reacts with isobutyronitrile to form $\alpha$-chloroisobutyronitrile. We have found that when isobutyronitrile is chlorinated in liquid phase at 50 to 60° C. in a glass flask illuminated by a strong electric light, the only monochloroisobutyronitrile which is formed is the $\alpha$-chloro derivative. None of the $\beta$-chloro derivative is formed but a small amount of a high boiling residue is formed which is probably a polychlorinated isobutyronitrile.

It has now been found that the monochlorides of saturated aliphatic nitriles can be obtained in good yields by carrying out the chlorination in the vapor phase at 250 to 550° C. The reaction is carried on in general by mixing the vapor of the saturated aliphatic nitrile with chlorine, passing the mixture through a reaction zone at the desired temperature and condensing the chlorinated product from the effluent gas. In this manner propionitrile yields a mixture of the $\alpha$- and $\beta$-monochloro derivatives and only very small amounts of dicholor propionitrile, which is the principal product of liquid phase chlorination. Isobutyronitrile gives good yields of $\beta$-chloroisobutyronitrile as well as the $\alpha$-chloro derivative which is the only monochloronitrile produced in liquid phase chlorination.

It is preferable to employ an excess of the aliphatic nitrile, for example, from two to ten mols of nitrile per mol of chlorine and to mix the reagents at 100 to 250° C. so as to prevent any condensation of the nitrile and consequent liquid phase chlorination. Within this temperature range very little reaction takes place in the vapor state. The reaction is then brought about by passing the mixture through a tube heated to 250 to 550° C. The vapor of the nitrile and the chlorine should be thoroughly mixed before entering the reaction zone and this can be accomplished in a number of well known ways.

The temperature of the gases within the reaction tube and their rate of flow are adjusted so that when the reaction mixture emerges from the tube all of the chlorine has been used up. Thus, with a faster rate of flow and a small reaction tube, temperatures in the upper part of the disclosed range will be required to use up the chlorine. The reaction tube may be packed with inert materials such as quartz, pebbles, nickel Raschig rings or turnings, glass wool, etc. which aid in the transfer of heat and lower the temperature required for complete consumption of the chlorine. Activated charcoal and carbon also lower the temperature required but they tend to cause decomposition of the products and lower yields. This packing is not essential, nor are catalysts necessary to obtain a complete reaction.

The gases emerging from the reaction zone are led to a condenser where the chlorinated nitrile and the unreacted starting material are condensed. The condensate contains some dissolved hydrogen chlorine which can be removed in a stripping column and the chlorinated nitrile can be separated from the unreacted aliphatic nitrile by fractional distillation, under reduced pressure if desired.

The initial mixture of the aliphatic nitrile and chlorine may be diluted with inert gases such as the hydrogen chloride obtained from the reaction, hydrogen, nitrogen or illuminating gas. Better results are thus obtained and a smaller excess of the aliphatic nitrile can be employed without reducing the yield of the monochlorinated nitrile.

The following examples will serve to illustrate the invention:

*Example 1.*—The vapor propionitrile at the rate of 2.76 mols per hour and chlorine at the rate of 0.57 mols per hour were passed through a mixing tube held at 150 to 160° C. and thence through a 600 cc. glass U-tube immersed in a molten salt bath at 325° C. The exit arm of the U-tube was filled with 4-8 mesh broken fused quartz. Practically no chlorine was found in the exit gases which were led to a condenser where the propionitrile and the chlorinated products were condensed. The unchanged propionitrile was removed by fractional distillation. The residue was then fractionated and the following products obtained, the yields being calculated on the amount of propionitrile consumed:

| | Per cent |
|---|---|
| α-Chloropropionitrile | 41 |
| β-Chloropropionitrile | 32 |
| α,α-Dichloropropionitrile | 12 |
| | 85 |

Some high-boiling residue remained containing higher chlorinated propionitriles. A small amount of a trichloropropionitrile was isolated from this residue.

*Example 2.*—The vapor of propionitrile at the rate of 2.74 mols per hour and chlorine at the rate of 0.55 mol per hour were passed through a mixing tube maintained at 175° C. and thence through a nickel tube, one-inch outside diameter and 36 inches long (volume 315 cc.) heated in an electric furnace to 485° C. The vapors leaving the reaction tube were free of chlorine. The products were condensed, the hydrogen chloride removed in a stripping column, the liquid passed into a fractionating column where the unreacted propionitrile, containing a small amount of α,α-dichloro propionitrile, was separated and returned to the system. The hydrogen chloride removed in the stripping column was passed through a trap maintained at −60° C. to condense any propionitrile and chlorinated products. Towards the end of the run when practically all the propionitrile had been consumed, the liquid in the trap was fed into the fractionating column where the unreacted propionitrile and the chlorinated products were separated. The yields, calculated on the propionitrile consumed, were—

| | Per cent |
|---|---|
| α-Chloropropionitrile | 46 |
| β-Chloropropionitrile | 41 |
| α,α-Dichloropropionitrile | 1.5 |
| | 88.5 |

A high-boiling residue was left after the above products had been distilled out of the crude product.

*Example 3.*—The vapor of isobutyronitrile at the rate of 2.63 mols per hour and chlorine at the rate of 0.45 mol per hour were passed through a nickel reactor at 460° C. according to the method described in Example 2 and the unreacted isobutyronitrile separated by fractional distillation from the chlorinated products was recirculated. The following products were obtained, the yields being calculated on the amount of isobutyronitrile consumed:

| | Per cent |
|---|---|
| α-Chloroisobutyronitrile | 36.6 |
| β-Chloroisobutyronitrile | 57.5 |
| | 94.1 |

Some high-boiling residue was also obtained.

*Example 4.*—The vapors of acetonitrile at the rate of 2.37 mols per hour and chlorine at the rate of 0.42 mol per hour were mixed in a preheater at 120° C. and passed into the nickel reactor described in Example 2 and heated to 460° C. and the unreacted acetonitrile was separated by distillation and recirculated. A total of 4.25 mols of acetonitrile was used in the experiment and at the end of the run, the liquid products were fractionally distilled to separate $CHCl_2CN$ B. P. 112–113° C. and $CH_2ClCN$ B. P. 123–124° from the $CCl_3CN$ B. P. 83–84° and unreacted acetronitrile B. P. 81°. The $CCl_3CN$ content of the recovered acetonitrile was determined and the following yields based on the acetonitrile used up were obtained:

| | Per cent |
|---|---|
| $CH_2ClCN$ | 51.6 |
| $CHCl_2CN$ | 5.5 |
| $CCl_3CN$ | 0.9 |
| | 58.0 |

Some losses occurred by decomposition of the chlorinated acetonitriles on distillation and there was some loss of materials carried out with the hydrogen chloride.

*Example 5.*—n-Butyronitrile was vaporized at the rate of 2.64 mols per hour and mixed with 0.48 mols per hour of chlorine in a preheater at 160° C. and passed through the nickel tube reactor at 450° C. The unreacted n-butyronitrile was separated by distillation and recirculated. A total of 3.04 mols of n-butyronitrile was used in the experiment and at the end of the run 0.19 mols were recovered. The chlorinated nitriles were separated by fractional distillation, and the following yields based on the nitrile used up were obtained:

| Product | B. P. | Yield |
|---|---|---|
| | Degrees | Percent |
| $CH_3CH_2CHClCN$ | 142–143 | 23.0 |
| $CH_3CHClCH_2CN$ | 175–176 | 40.0 |
| $CH_2ClCH_2CH_2CN$ | 196–197 | 22.2 |
| | | 85.2 |

A high boiling residue of 14.4 g. was also obtained which probably contains some polychlorinated nitriles.

Other nitriles may be converted to their monochloro derivatives by this process. Such nitriles are acetonitrile, n-butyronitrile, n-valeronitrile, isovaleronitrile, sec. valeronitrile, capronitrile, 3-pentylcyanide, n-hexylcyanide, n-heptylcyanide, lauronitrile and myristonitrile.

The corresponding monobromo aliphatic nitriles may be prepared in a similar manner by substituting a molecularly equivalent amount of bromine for the chlorine shown in the foregoing examples.

We claim:
1. The process of preparing halogenated saturated aliphatic nitriles which comprises passing a gaseous mixture containing the vapor of a saturated aliphatic nitrile and a member of the group consisting of chlorine and bromine through a reaction zone at a temperature of 250 to 550° C.
2. The process of preparing chlorinated saturated aliphatic nitriles which comprises passing a gaseous mixture containing the vapor of a saturated aliphatic nitrile and chlorine through a reaction zone at a temperature of 250 to 550° C.
3. The process of preparing the monochloro derivatives of saturated lower aliphatic nitriles which comprises passing a gaseous mixture containing the vapor of a saturated aliphatic nitrile and chlorine through a reaction zone at a temperature of 250 to 550° C.

4. The process of preparing monochloro propionitriles which comprises passing a gaseous mixture containing the vapor of propionitrile and chlorine and having a molecular excess of the nitrile through a reaction zone at a temperature of 250 to 550° C.

5. The process of preparing monochloro isobutyronitriles which comprises passing a gaseous mixture containing the vapor of isobutyronitrile and chlorine and having a molecular excess of the nitrile through a reaction zone at a temperature of 250 to 550° C.

6. The process of preparing chlorinated saturated aliphatic nitriles which comprises passing a gaseous mixture containing a vapor of a saturated aliphatic nitrile and chlorine through a preheating zone at a temperature of 100 to 250° C. and thence through a reaction zone at a temperature of 250 to 550° C.

7. The process of preparing monochloro propionitriles which comprises passing a gaseous mixture containing the vapor of propionitrile and chlorine and having a molecular excess of the nitrile through a preheating zone at a temperature of 100 to 250° C. and thence through a reaction zone at a temperature of 250 to 550° C.

8. The process of preparing monochloro isobutyronitriles which comprises passing a gaseous mixture containing the vapor of isobutyronitrile and chlorine and having a molecular excess of the nitrile through a preheating zone at a temperature of 100 to 250° C. and thence through a reaction zone at a temperature of 250 to 550° C.

LE ROY U. SPENCE.
DARREL J. BUTTERBAUGH.